US010331171B2

(12) United States Patent  
Seino

(10) Patent No.: US 10,331,171 B2  
(45) Date of Patent: Jun. 25, 2019

(54) DISPLAY DEVICE AND ELECTRONIC APPARATUS

(71) Applicant: NEC Personal Computers, Ltd., Tokyo (JP)

(72) Inventor: Satoshi Seino, Tokyo (JP)

(73) Assignee: NEC PERSONAL COMPUTERS, LTD., Tokyo (JP)

(*) Notice: Subject to any disclaimer, the term of this patent is extended or adjusted under 35 U.S.C. 154(b) by 0 days.

(21) Appl. No.: 16/041,361

(22) Filed: Jul. 20, 2018

(65) Prior Publication Data

US 2019/0086959 A1 Mar. 21, 2019

(30) Foreign Application Priority Data

Sep. 21, 2017 (JP) .................................. 2017-180960

(51) Int. Cl.
*G06F 1/16* (2006.01)
*G02F 1/1333* (2006.01)

(52) U.S. Cl.
CPC ...... *G06F 1/1637* (2013.01); *G02F 1/133308* (2013.01); *G06F 1/1656* (2013.01); *G02F 2001/133314* (2013.01); *G02F 2001/133331* (2013.01)

(58) Field of Classification Search
None
See application file for complete search history.

(56) References Cited

U.S. PATENT DOCUMENTS

| | | | | |
|---|---|---|---|---|
| 2006/0061256 A1* | 3/2006 | Oroku | ..................... | H01J 9/242 313/496 |
| 2007/0165152 A1* | 7/2007 | Suzuki | ............. | G02F 1/133308 349/58 |
| 2011/0226335 A1* | 9/2011 | Naitoh | .................... | H02S 20/00 136/259 |
| 2011/0285925 A1* | 11/2011 | Ono | ....................... | F16M 11/10 348/836 |

(Continued)

FOREIGN PATENT DOCUMENTS

JP 2015-172981 A 10/2015

*Primary Examiner* — Courtney L Smith  
*Assistant Examiner* — Rashen E Morrison  
(74) *Attorney, Agent, or Firm* — Shimokaji IP

(57) ABSTRACT

A display device is able to prevent peeling-off and falling-off of a component while promoting improvement of appearance quality and downsizing of the display device itself. The display device includes a display panel, cover glass which is disposed on the front-face side of the display panel, a back-face cover which is disposed on the back-face side of the display panel, a bezel member having a vertical wall which is disposed upright on the inner-face side of an outer peripheral edge of the back-face cover and surrounds a peripheral edge of the display panel and a cushion member which is fixed to the bezel member and protects an outer peripheral end face of the cover glass. The cushion member has a first part which protects the outer peripheral end face of the cover glass by covering the inner face of the vertical wall, ranging from the front face of the glass support piece to the front-end face of the vertical wall, and a second part which is disposed contiguously to the first part and covers the vertical wall, ranging from the front-end face to an outer face of the vertical wall.

3 Claims, 4 Drawing Sheets

(56) References Cited

U.S. PATENT DOCUMENTS

| | | | | |
|---|---|---|---|---|
| 2014/0362554 | A1* | 12/2014 | Rikiishi | G09F 9/302 |
| | | | | 361/809 |
| 2015/0042899 | A1* | 2/2015 | Tomomasa | G02F 1/133308 |
| | | | | 348/790 |
| 2015/0225275 | A1* | 8/2015 | Tomomasa | C03B 11/082 |
| | | | | 65/61 |
| 2015/0277179 | A1* | 10/2015 | Nishi | G02B 6/0088 |
| | | | | 349/58 |
| 2016/0274297 | A1* | 9/2016 | Ikuta | G02B 6/0081 |
| 2016/0282549 | A1* | 9/2016 | Masuda | G02B 6/0085 |

* cited by examiner

DISPLAY DEVICE AND ELECTRONIC APPARATUS

FIELD OF THE INVENTION

The present invention relates to a display device and an electronic apparatus equipped with the display device.

BACKGROUND OF THE INVENTION

An electronic apparatus such as a Laptop personal computer (a Laptop PC), a tablet-type personal computer (a tablet-type PC) and so forth is equipped with a display device such as a liquid crystal display and so forth. There are cases where a structure that a front face of a display panel such as a liquid crystal panel and so forth is protected by cover glass is used in the display device of this kind (for example, Japanese Patent No. 6006380).

Incidentally, it is necessary for the display device of this kind to promote upsizing of a display region and downsizing of a chassis in order to promote downsizing of the display device itself while improving appearance quality of the display device itself. Accordingly, it is necessary to narrow also a width dimension of a bezel member which surrounds the display panel.

FIG. 4 is a sectional diagram schematically illustrating one example of an inner structure of one edge of a related art display device 100. The display device 100 illustrated in FIG. 4 is equipped with a frame-shaped bezel member 104 which surrounds a peripheral edge of a display panel 102 and cover glass 110 is fixed to a front face of a glass support piece 108 which is disposed on an inner face of a vertical wall 106 of the bezel member 104. In the display device 100, a cushion member 112 which is made of a rubber material is fixed to the front face of the glass support piece 108 and thereby an outer peripheral end face 110a of the cover glass 110 is protected in order to ensure shock resistance of the cover glass 110.

SUMMARY OF THE INVENTION

Incidentally, in the display device 100 as described above, when attempting to make an apparent width dimension Wa of the bezel member 104 including the cushion member 112 in appearance narrow, an end lateral space of the display panel 102 is narrowed. Therefore, it is difficult to sufficiently secure a sticking area between the glass support piece 108 and the cover glass 110 and thus a fixing strength of the cover glass 110 is reduced. Further, it becomes also difficult to sufficiently secure a sticking area of the cushion member 112 over which the cushion member 112 is stuck to (hereinafter, referred to as relative to) the glass support piece 108 and the vertical wall 106 and thus a fixing strength of the cushion member 112 is reduced. In addition, in a case of attempting to make an actual width dimension Wb of the bezel member 104 including the glass support piece 108 narrow, it becomes more difficult to secure the sticking area of the cover glass 110 relative to the glass support piece 108. Consequently, in the display device 100 as described above, it is feared that peeling-off and falling-off of the cover glass 110 and the cushion member 112 would occur. That is, in the related art display device 100, it is necessary to sufficiently secure widths of the glass support piece 108 and the cushion member 112, that is, the width dimension of the bezel member 104 in order to sufficiently ensure the fixing strength of the cover glass 110 and the cushion member 112.

The present invention has been made in view of the above-described issues of the related art and aims to provide a display device which is able to prevent peeling-off and falling-off (i.e., detachment) of components while promoting improvement of the appearance quality and downsizing of the display device itself and an electronic apparatus equipped with the display device.

A display device according to the first aspect of the present invention includes a display panel, cover glass which is disposed on the front-face side of the display panel, a back-face cover which is disposed on the back-face side of the display panel, a frame-shaped member having a vertical wall which is disposed upright on the inner-face side of an outer peripheral edge of the back-face cover and surrounds a peripheral edge of the display panel, and a cushion member which is fixed to the frame-shaped member and protects an outer peripheral end face of the cover glass. The frame-shaped member has a glass support piece which projects from an inner face of the vertical wall toward an in-frame direction at a position between a one-end face and an other-end face of the vertical wall and supports a back face of the cover glass by a front face of the glass support piece itself, and the cushion member has a first part which protects the outer peripheral end face of the cover glass by covering the inner face of the vertical wall, ranging from the front face of the glass support piece to the one-end face of the vertical wall, and a second part which is disposed contiguously to the first part and covers the vertical wall, ranging from the one-end face to an outer face of the vertical wall.

According to such a configuration as described above, it becomes possible for the cushion member to protect the outer peripheral end face of the cover glass with the aid of the first part and it becomes possible to fix the cushion member to the bezel member over a large sticking area with the aid of the first part and the second part. Therefore, the cushion member is firmly adhered to the bezel member, and peeling-off and falling-off of the cushion member are prevented. Further, the cushion member is firmly adhered to the bezel member by utilizing an outer face of the vertical wall in addition to an inner face of the vertical wall. Therefore, even when widths of the vertical wall and the first part and the second part which cover the vertical wall which define the apparent width dimension of the bezel member are made narrow, it is possible to prevent occurrence of peeling-off and falling-off of the cushion member and improvement of the appearance quality and downsizing of the display device become possible. Moreover, in the display device according to the first aspect of the present invention, even in a case where a thickness of the first part which serves as a cushion part for the cover glass is minimized in a range that it is possible to ensure cushioning characteristics of the first part, it is possible to prevent occurrence of peeling-off and falling-off of the cushion member by securing the sticking area of the second part. In addition, in the display device according to the first aspect of the present invention, even in a case where the actual width dimension of the bezel member also including the glass support piece is made further narrower, since it is possible to configure the first part of the cushion member so as to have the narrow width, it is possible to sufficiently secure the sticking area of the cover glass relative to the glass support piece. Accordingly, in the display device according to the first aspect of the present invention, it is possible to minimize the sticking area of the first part relative to the front face of the glass support piece and thereby increase the sticking area of the cover glass relative to the glass support piece. Therefore, it is possible to ensure the sticking strength of the cover glass relative to the bezel member even in a case where the bezel member is made narrow in width.

The cushion member may be also configured to have a third part which is disposed contiguously to the first part and is nipped and held between the front face of the glass support piece and the back face of the cover glass by covering at least part of the front face of the glass support piece. Then, it is possible to prevent the third part and the first part which contiguously extends from the third part from peeling off with an end of the third part as a starting point.

The cushion member may be also configured to have a fourth part which is disposed contiguously to the second part and is nipped and held between the other-end face of the vertical wall and the inner face of the back-face cover by covering the other end face of the vertical wall. Then, it is possible to prevent the forth part and the second part which contiguously extends from the fourth part from peeling off with an end of the fourth part as the starting point.

An electronic apparatus according to the second aspect of the present invention includes the display device which is configured as described above and a control unit which controls the display device.

According to the above-described aspects of the present invention, it is possible to prevent peeling-off and falling-off of the component such as the cushion member and so forth while promoting improvement of the appearance quality and downsizing of the display device.

DETAILED DESCRIPTION OF THE INVENTION

In the following, a display device 10 according to one embodiment of the present invention will be described in detail with reference to the appended drawings by giving a preferable embodiment while exemplifying an electronic apparatus 12 equipped with the display device 10.

Figure 1:
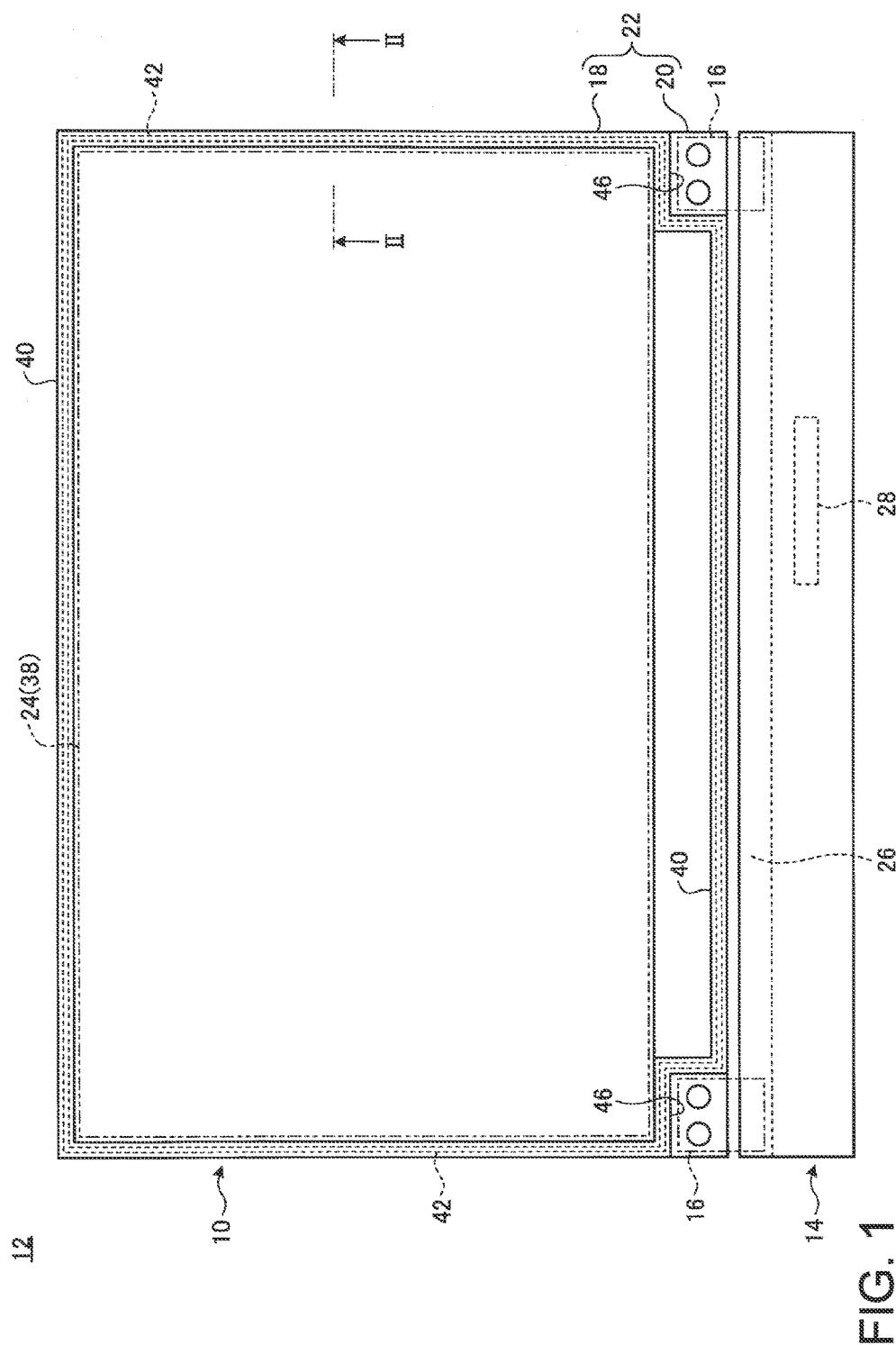
FIG. 1 is a front view schematically illustrating one example of a configuration of an electronic apparatus equipped with a display device according to one embodiment of the present invention.

FIG. 1 is a front view schematically illustrating one example of a configuration of the electronic apparatus 12 equipped with the display device 10 according to one embodiment of the present invention. FIG. 1 is the front view of the electronic apparatus 12 which is a Laptop PC in a state of being brought into a use form by lifting the display device 10 which serves as a display chassis upward from a main body chassis 14. It is possible to utilize the display device 10 according to one embodiment of the present invention as display devices for various electronic apparatuses such as, for example, a tablet-type PC, a mobile phone, a smartphone, a gaming machine and so forth other than such a Laptop PC as described above.

As illustrated in FIG. 1, the electronic apparatus 12 has a structure that the display device 10 and the main body chassis 14 are coupled together to be rotationally movable via one pair of left and right hinges 16, 16.

The display device 10 includes a chassis 22 having a bezel member 18 and a back-face cover 20 and a display 24. The chassis 22 is formed into a rectangular box shape by the bezel member 18 which is a frame-shaped member and the rectangular plate-shaped back-face cover 20 and the display 24 is disposed in a front-face opening of the chassis 22. The display 24 is, for example, a liquid crystal display, an organic EL (Electro Luminescence) display and so forth.

The main body chassis 14 is formed into a rectangular box shape and a keyboard 26 is disposed on an upper face of the main body chassis 14. A control unit 28 which controls the display device 10 is disposed in the main body chassis 14. The control unit 28 may be implemented by making a processing device such as, for example, a CPU (Central Processing Unit) and so forth execute a program, that is, may be implemented with software, may be implemented with hardware such as, for example, an IC (Integrated Circuit) and so forth and may be implemented by using the software together with the hardware. Various electronic components such as an electronic substrate, a memory and so forth are loaded in the main body chassis 14 together with the control unit 28. The main body chassis 14 and the display device 10 are electrically connected with each other by a not-illustrated cable which is laid through the hinges 16, 16.

Figure 2:
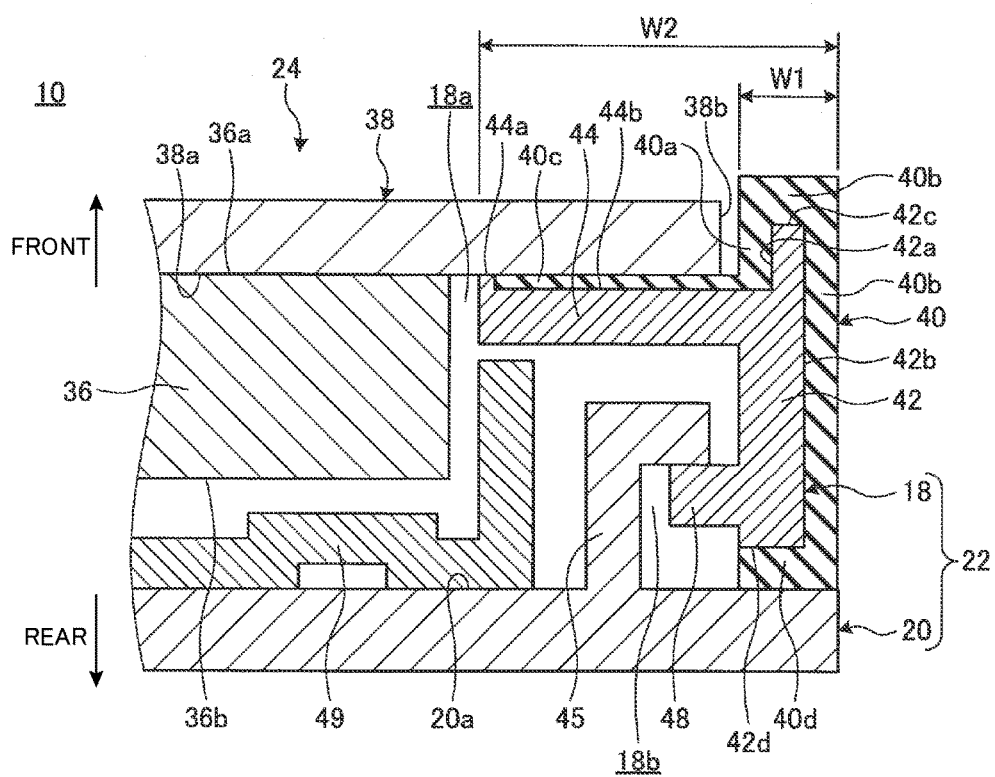
FIG. 2 is a sectional diagram along the II-II line in FIG. 1 schematically illustrating one example of an inner structure of one edge of the display device.

FIG. 2 is a sectional diagram along the II-II line in FIG. 1 schematically illustrating one example of an inner structure of the display device 10.

As illustrated in FIG. 2, the display device 10 includes the chassis 22 having the bezel member 18 and the back-face cover 20, the display 24 having a display panel 36 and cover glass 38 and a cushion member 40. In the following, the display device 10 will be described by calling the cover-glass-38 side which configures a display face of the display device 10 as the front and calling the back-face-20 side which configures a back face of the display device 10 as the rear.

The bezel member 18 is a frame-shaped member made of resin, metal and so forth. A front-face opening 18a of the bezel member 18 is closed with the cover glass 38 and a rear-face opening 18b of the bezel member 18 is closed with the back-face cover 20. The bezel member 18 has a vertical wall 42 and a glass support piece 44.

The vertical wall 42 has a tabular sectional shape which extends in a front-back direction. The vertical wall 42 is a frame body which is formed into an almost rectangular shape except left and right recessed parts 46, 46 which serve as clearance parts for the hinges 16, 16 (see FIG. 1). The vertical wall 42 forms an outer peripheral wall of the chassis 22 and surrounds a peripheral edge of the display panel 36. In a case where the electronic apparatus 12 is, for example, the tablet-type PC, the bezel member 18 may be configured into a rectangular shape having no recessed part 46. In a case of the configuration example illustrated in FIG. 2, part of an inner face 42a which is located on the front beyond the glass support piece 44, an outer face 42b, a front-end face (one-end face) 42c and a rear-end face (other-end face) 42d of the vertical wall 42 are covered with the cushion member 40.

The glass support piece 44 is a tabular plate piece which projects from the inner face 42a of the vertical wall 42 in an in-frame direction at a position between the front-end face 42c and the rear-end face 42d. The glass support piece 44 supports a back face 38a of the cover glass 38 using a front face 44a which faces the front. In the case of the configuration example illustrated in FIG. 2, a recessed portion 44b which leads to the inner face 42a of the vertical wall 42 is formed in most part of a front face 44a of the glass support piece 44. Therefore, the glass support piece 44 supports the cover glass 38 using the cushion member 40 disposed in the recessed portion 44b and the front face 44a.

The bezel member 18 has an engagement piece 48 which is projectingly disposed on the inner face 42a of the vertical wall 42 which is located on the rear beyond the glass support piece 44. The engagement piece 48 is a tabular plate piece which is engaged with an engagement hook 45 which projects from the inner face 20a of the back-face cover 20.

The back-face cover 20 is a plate-shaped member which is made of resin, metal and so forth. The back-face cover 20 closes the rear-face opening 18b in the bezel member 18 and forms a back face (a bottom face) of the chassis 22. The vertical wall 42 of the bezel member 18 is disposed upright on the outer peripheral edge of the inner face 20a of the back-face cover 20. The engagement hook 45 which is appropriately disposed along the outer peripheral edge of the back-face cover 20 is engaged with the engagement piece 48 of the bezel member 18 and thereby the back-face cover 20 is coupled with the bezel member 18. The back-face cover 20 may be coupled with the bezel member 18 by using a not-illustrated fastener such as a screw and so forth. A bracket 49 is mounted on the inner face 20a of the back-face cover 20 at a position which is closer to the in-frame direction than the engagement hook 45. The bracket 49 is a reinforcing material which is disposed on each of left-end and right-end sides of the back-face cover 20 and ensures the rigidity of the chassis 22.

The display panel 36 is a rectangular panel. The cover glass 38 is disposed on the front-face-36a side which faces forward and the bracket 49 and the back-face cover 20 are disposed on the back-face-36b side which faces rearward. A peripheral edge of the display panel 36 is surrounded by the bezel member 18. The display panel 36 displays an image on the front-face-36a side through the cover glass 38. The display panel 36 is, for example, a liquid crystal display panel, an organic EL display panel and so forth. The display panel 36 may have a structure that a touch panel is laminated at a position between the front face 36a and the cover glass 38.

The cover glass 38 is a rectangular transparent glass plate which has an outer shape which is larger than that of the display panel 36 and protects the display panel 36. The cover glass 38 closes the front-face opening 18a in the bezel member 18 and substantially forms the front face of the chassis 22. The back face 38a of the cover glass 38 is laminated on the front-face-36a side of the display panel 36 and an outer peripheral edge of the back face 38a of the cover glass 38 is fixed onto the front face 44a of the glass support piece 44. In the case of the configuration example illustrated in FIG. 2, the cover glass 38 is fixed to the front face 44a of the glass support piece 44 and the front face of the cushion member 40 in the recessed portion 44b which is formed in the front face 44a by using an adhesive, double-sided tape and so forth.

The cushion member 40 is made of rubber, soft resin and so forth and protects the outer peripheral end face 38b of the cover glass 38. The cushion member 40 has a first part 40a, a second part 40b, a third part 40c and a fourth part 40d. The cushion member 40 is adhered to the bezel member 18 by integral molding. The cushion member 40 may be adhered to the bezel member 18 with the adhesive, the double-sided tape and so forth.

The first part 40a is disposed to cover the inner face 42a of the vertical wall 42, ranging from the front face 44a of the glass support piece 44, that is, the bottom face of the recessed portion 44b of the glass support piece 44 in the configuration example illustrated in FIG. 2, to the front-end face 42c of the vertical wall 42. That is, in the configuration example illustrated in FIG. 2, since the recessed portion 44b is formed in the front face 44a of the glass support piece 44, the bottom face of the recessed portion 44b serves as the front face of the glass support piece 44 to which the first part 40a is to be fixed. The second part 40b is disposed to contiguously extend from the first part 40a, to run around the front-end face 42c and thereby to cover a section which ranges from the front-end face 42c to the outer face 42b of the vertical wall 42. The third part 40c is disposed to contiguously extend from the first part 40a and to cover part of the front face 44a of the glass support piece 44 by being disposed in the recessed portion 44b. In a case where the glass support piece 44 has a structure having no recessed portion 44b, the third part 40c is disposed to cover part or the whole of the front face 44a. The fourth part 40d is disposed to contiguously extend from the second part 40b and to cover the rear-end face 42d of the vertical wall 42.

In this case, in the display device 10 according to one embodiment, the first part 40a of the cushion member 40 is disposed to face the outer peripheral end face 38b of the cover glass 38 and thereby it becomes possible to protect the outer peripheral end face 38b by the first part 40a. In addition, the cushion member 40 has the second part 40b to the fourth part 40d which serve as expanded parts for fixing the cover glass 38 to the bezel member 18, in addition to the first part 40a which actually serves as a cushion part for the cover glass 38. Therefore, the cushion member 40 has a remarkably large sticking area relative to the bezel member 18. Consequently, the cushion member 40 is firmly adhered to the bezel member 18 and peeling-off and falling-off of the cushion member 40 are prevented.

Further, the cushion member 40 is firmly adhered to the bezel member 18 by utilizing the outer face 42b and so forth, in addition to the inner face 42a of the vertical wall 42. For this reason, even in a case where the widths of the vertical wall 42 and the first part 40a and the second part 40b which cover the vertical wall 42 which are exposed to the front face of the display device 10 in appearance and define an apparent width dimension W1 of the bezel member 18 are made narrow, the display device 10 according to one embodiment is able to prevent occurrence of peeling-off and falling-off of the cushion member 40 and thereby improvement of the appearance quality and downsizing of the display device 10 itself become possible. Moreover, even in a case where the thickness of the first part 40a which serves as the cushion part is minimized within a range in which it is possible to ensure the cushioning characteristics, the display device 10 according to one embodiment is able to prevent occurrence of peeling-off and falling-off of the cushion member 40 with the aid of the action of the second part 40b and so forth. In addition, in the display device 10 according to one embodiment, even in a case where an actual width dimension W2 (although the width dimension W2 indicates a width dimension measured from the second part 40b to the end face of the glass support piece 44 in the example in FIG. 2, the width dimension W2 may also indicate a width dimension measured from the outer face 42b to the end face of the glass support piece 44) of the bezel member 18 including the glass support piece 44 is made further narrower, it is possible to sufficiently secure the sticking area of the cover glass 38 relative to the glass support piece 44 because it is possible to narrow the width of the first part 40a of the cushion member 40. Thereby, in the display device 10 according to one embodiment, it is possible to increase the sticking area of the cover glass 38 relative to the glass support piece 44 by minimizing the sticking area of the first part 40a relative to the front face 44a (the recessed portion 44b) of the glass support piece 44. Therefore, the display device 10 according to one embodiment is able to improve the sticking strength of the cover glass 38 relative to the bezel member 18 even when the width of the bezel member 18 is made narrow.

In the display device 10 according to one embodiment, the third part 40c of the cushion member 40 is nipped and held between the front face 44a (or the recessed portion 44b) of the glass support piece 44 and the back face 38a of the cover glass 38. Therefore, the third part 40c and the first part 40a which contiguously extends from the third part 40c are prevented from peeling off with an end of the third part 40c as a starting point. In addition, since the third part 40c also functions as the cushion part for the back face 38a of the cover glass 38, protective performance of the cover glass 38 is improved. In addition, in the display device 10 according to one embodiment, the fourth part 40d of the cushion member 40 is nipped and held between the rear-end face 42d of the vertical wall 42 and the inner face 20a of the back-face cover 20. Therefore, the fourth part 40d and the second part 40b which contiguously extends from the fourth part 40d are prevented from peeling off with an end of the fourth part 40d as the starting point.

As illustrated in FIG. 2, in the display device 10 according to one embodiment, the cushion member 40 and the cover glass 38 are in a positional relation that the second part 40b of the cushion member 40 which covers the front-end face 42c of the vertical wall 42 protrudes forward beyond the front face of the cover glass 38. Therefore, in the display device 10 according to one embodiment, the second part 40b which covers the front-end face 42c serves as the cushion part for an upper face of the main body chassis 14. Therefore, it is not necessary for the electronic apparatus according to one embodiment to additionally install abutment rubber which lands on the upper face of the main body chassis 14 on a front face of the display chassis (the display device 10) unlike a general Laptop PC and a reduction in the number of components and more improvement of the appearance quality become possible.

Incidentally, the cushion member 40 of a configuration having at least the second part 40b together with the first part 40a is sufficient to ensure the cushioning performance for the cover glass 38 and the sufficient sticking strength relative to the bezel member 18. One example of an inner structure of one edge of the display device 10 which is equipped with a cushion member 50 according to a modified example is schematically illustrated, for example, in FIG. 3.

Figure 3:
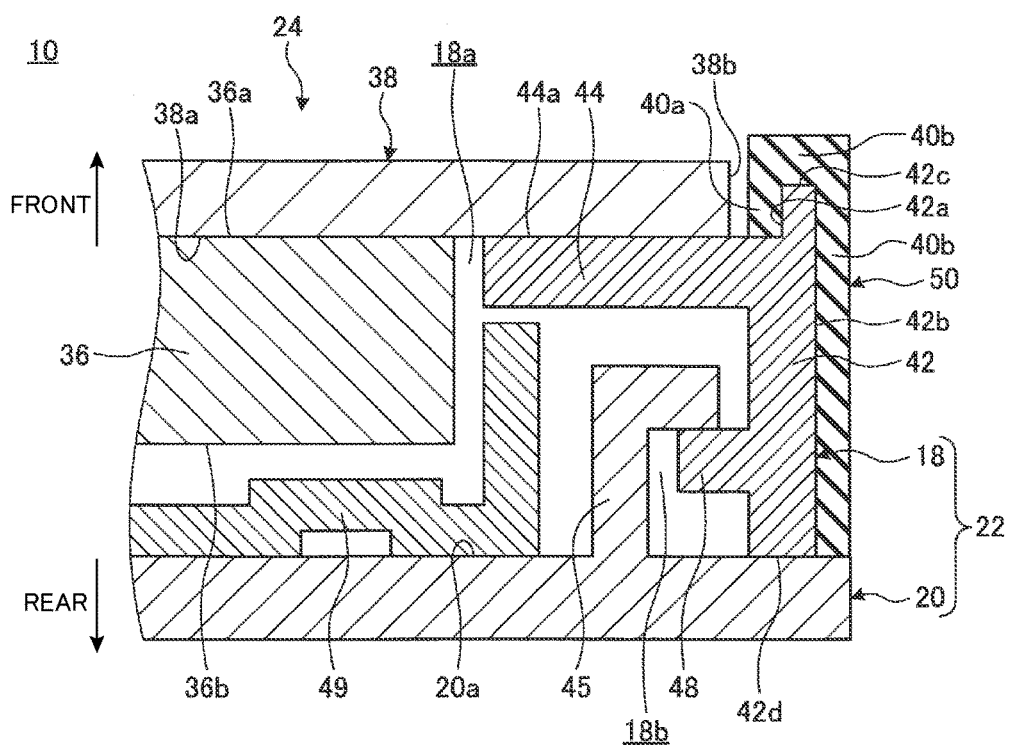
FIG. 3 is a sectional diagram schematically illustrating one example of an inner structure of one edge of a display device equipped with a cushion member according to a modified example.

The cushion member 50 illustrated in FIG. 3 is different from the cushion member 40 illustrated in FIG. 2 in the point that the cushion member 50 has no third part 40c and fourth part 40d. In the cushion member 50, an end of the first part 40a is stuck to the front face 44a of the glass support piece 44 and an end of the second part 40b is stuck to the inner face 20a of the back-face cover 20. Therefore, it is possible to eliminate the recessed portion 44b from the glass support piece 44. In addition, the rear-end face 42d of the vertical wall 42 is supported in abutment on the inner face 20a of the back-face cover 20. It goes without saying that the cushion member 50 may be configured to have the third part 40c or the fourth part 40d which is the same as that of the cushion member 40 illustrated in FIG. 2 together with the first part 40a and the second part 40b.

Incidentally, it goes without saying that the present invention is not limited to the above-described embodiment and modified example and may be modified and altered freely within a range not deviating from the gist of the present invention.

Figure 4:
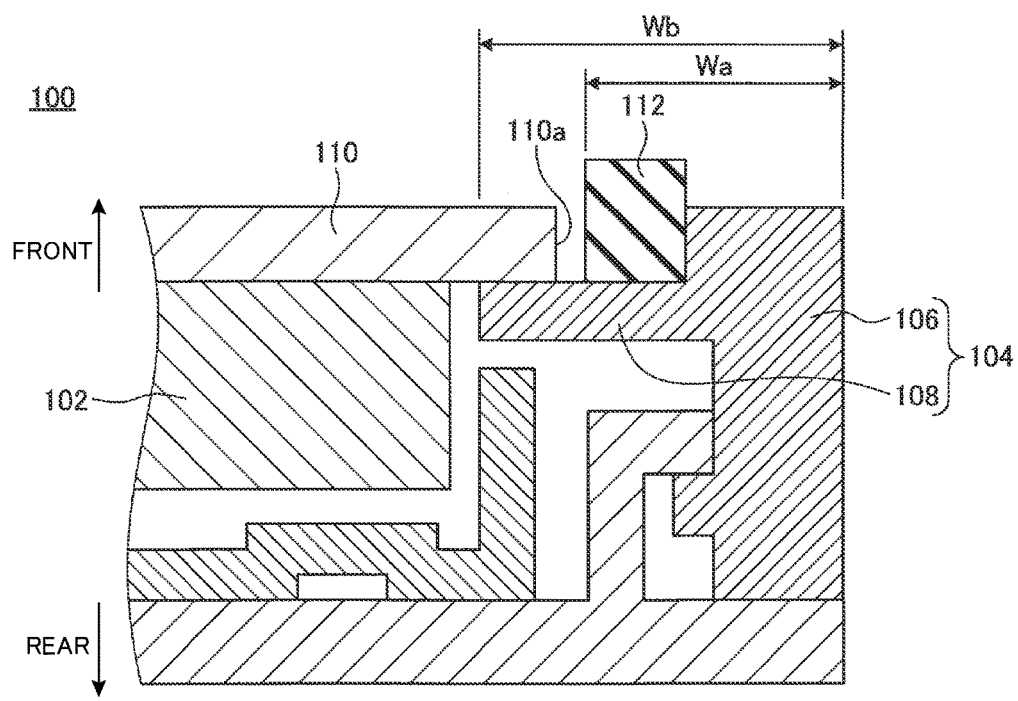
FIG. 4 is a sectional diagram schematically illustrating one example of an inner structure of one edge of a related art display device.

Although, in the above-described embodiment, the configuration that the cushion member 40 (50) is disposed along the full length of the outer periphery of the bezel member 18 is exemplified, the cushion member 40 (50) may be disposed only on part of the outer periphery of the bezel member 18. For example, a configuration that the cushion member 40 (50) is applied only to three sides except a side on which the hinges 16, 16 are disposed in the four peripheries of the bezel member 18 and the cushion member 112 which is the same as that of the related art illustrated in FIG. 4 is disposed on the side on which the hinges 16, 16 are disposed and parts in which the recessed parts 46, 46 are formed and so forth may be also made.

The invention claimed is:

1. A display device comprising:
a display panel;
a cover glass on a front-face side of the display panel;
a back-face cover on the back-face side of the display panel;
a frame-shaped member having a vertical wall which is disposed upright on an inner-face side of an outer peripheral edge of the back-face cover and surrounds a peripheral edge of the display panel; and
a cushion member which is fixed to the frame-shaped member and protects an outer peripheral end face of the cover glass, wherein:
the frame-shaped member has a glass support piece which projects from an inner face of the vertical wall toward an in-frame direction, at a position between a one-end face and an other-end face of the vertical wall, and supports a back face of the cover glass by a front face of the glass support piece itself,
the cushion member has a first part which protects the outer peripheral end face of the cover glass by covering the inner face of the vertical wall, extending from the front face of the glass support piece to the one-end face of the vertical wall, and a second part disposed contiguously to the first part and covers the vertical wall, extending from the one-end face to an outer face of the vertical wall; and
the cushion member has a third part which is disposed contiguously to the first part, and is nipped and held between the front face of the glass support piece and the back face of the cover glass by covering at least part of the front face of the glass support piece.

2. A display device comprising:
a display panel;
a cover glass on a front-face side of the display panel;
a back-face cover on the back-face side of the display panel;
a frame-shaped member having a vertical wall which is disposed upright on an inner-face side of an outer peripheral edge of the back-face cover and surrounds a peripheral edge of the display panel; and
a cushion member which is fixed to the frame-shaped member and protects an outer peripheral end face of the cover glass, wherein:
the frame-shaped member has a glass support piece which projects from an inner face of the vertical wall toward an in-frame direction, at a position between a one-end face and an other-end face of the vertical wall, and supports a back face of the cover glass by a front face of the glass support piece itself, and the cushion member has a first part which protects the outer peripheral end face of the cover glass by covering the inner face of the vertical wall, extending from the front face of the glass support piece to the one-end face of the vertical wall, and a second part disposed contiguously to the first part and covers the vertical wall, extending from the one-end face to an outer face of the vertical wall; and the cushion member has a fourth part which is disposed contiguously to the second part, and is nipped and held between the other-end face of the vertical wall and the inner face of the back-face cover by covering the other-end face of the vertical wall.

3. An electronic apparatus comprising:
a display device having:
 a display panel;
 a cover glass on a front-face side of the display panel;
 a back-face cover on the back-face side of the display panel;
 a frame-shaped member having a vertical wall which is disposed upright on an inner-face side of an outer peripheral edge of the back-face cover and surrounds a peripheral edge of the display panel; and
 a cushion member which is fixed to the frame-shaped member and protects an outer peripheral end face of the cover glass, wherein:
the frame-shaped member has a glass support piece which projects from an inner face of the vertical wall toward an in-frame direction, at a position between a one-end face and an other-end face of the vertical wall, and supports a back face of the cover glass by a front face of the glass support piece itself, and the cushion member has a first part which protects the outer peripheral end face of the cover glass by covering the inner face of the vertical wall, extending from the front face of the glass support piece to the one-end face of the vertical wall, and a second part disposed contiguously to the first part and covers the vertical wall, extending from the one-end face to an outer face of the vertical wall;

the cushion member has a third part which is disposed contiguously to the first part, and is nipped and held between the front face of the glass support piece and the back face of the cover glass by covering at least part of the front face of the glass support piece; and a control unit which controls the display device.

* * * * *